United States Patent [19]
Hirose

[11] 3,740,131

[45] June 19, 1973

[54] DEVICE FOR AUTOMATICALLY DISPLAYING AND WITHDRAWING AN ORIGINAL POSITIONING SCALE

[75] Inventor: Hiroshi Hirose, Tokyo, Japan

[73] Assignee: Ricoh Co., Ltd., Tokyo, Japan

[22] Filed: Dec. 27, 1971

[21] Appl. No.: 212,159

[30] Foreign Application Priority Data
Dec. 25, 1970 Japan.............................. 45/130832

[52] U.S. Cl..................................... 355/75, 355/61
[51] Int. Cl. .......................................... G03b 27/62
[58] Field of Search .............. 355/61, 75; 356/171, 356/172

[56] References Cited
UNITED STATES PATENTS
3,627,411  12/1971  Nagel................................ 355/75 X
3,630,611  12/1971  Hoyer................................... 355/75

Primary Examiner—John M Horan
Assistant Examiner—Michael Harbis
Attorney—Henry T. Burke, Robert Scobey, P. E. Henninger et al.

[57] ABSTRACT

A device provided in copying apparatus of the type in which exposing of copy sheets to an optical image of the original is carried out by using reflected light. The device is effective to move an original positioning scale to display the scale at one end edge of the transparent original receiving surface, on an inner side thereof, when the original is placed on the original receiving surface at the start of an exposing operation, and to withdraw the scale out of view of the operator at the time of actual exposure, so that the scale is not in the path of the light reflected from the original while the copy is being exposed.

5 Claims, 4 Drawing Figures

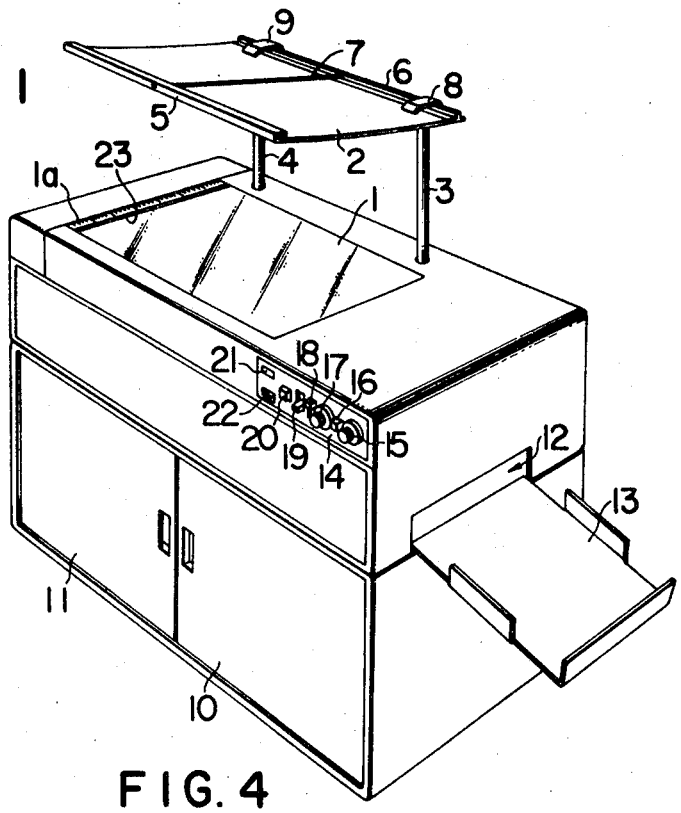
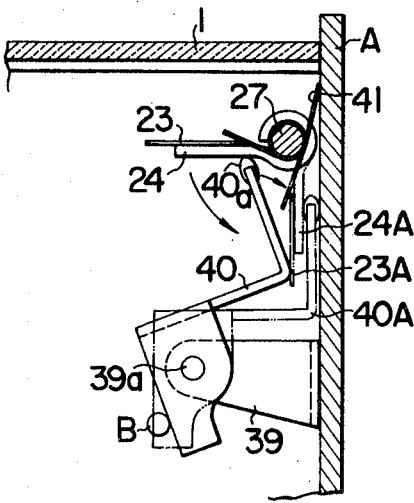

DEVICE FOR AUTOMATICALLY DISPLAYING AND WITHDRAWING AN ORIGINAL POSITIONING SCALE

BACKGROUND OF THE INVENTION

This invention relates to a device for automatically displaying and withdrawing an original positioning scale having particular utility in copying apparatus of the type in which exposing of copy sheets to an optical image of an original to be duplicated is carried out by using reflected light, such for example as electrophotographic copying apparatus or electrophotographic engraving machines.

In copying apparatus of the type in which exposing of copy sheets to an optical image of an original to be duplicated is carried out by using reflected light, the original is placed on a transparent copy receiving surface. The original is illuminated from beneath the original receiving surface so as to effect exposing of a photosensitive sheet or copy sheet to an optical image of the original by using the light reflected by the original placed on the original receiving surface.

Originals from which duplicates are to be made vary in size; some are large and some are small. It is thus required to correctly position each original on the original receiving surface in order to obtain proper registration of the original with the photosensitive sheet at the time of exposure. To this end, a scale is generally provided at one end edge of the original receiving surface to aid in correctly positioning the original.

When duplicates of a page of a bulky book are to be made, the book is opened and one half portion of the book carrying the page to be duplicated is placed on the original receiving surface while the other half portion extends out of the surface of the apparatus with the bound portion of the book resting on a shoulder of the original receiving surface. In some copying apparatus of the type described, the size of the original receiving surface may be substantially of the same size as the exposing area in order to econimize on the space in which the apparatus is to be installed. In such cases, the original receiving surface must be made full use of, so that there is no room to firmly secure the original positioning scale to one end edge of the original receiving surface.

SUMMARY OF THE INVENTION

This invention has as its object the provision of a device for automatically displaying an original positioning scale at the start of an exposing operation, and withdrawing of the scale when actual exposure begins. The original positioning is moved to a displayed position by a movable member actuated in association with an exposing operation, such as a movable original keepplate support rod or a movable member of a movable optical system for exposing, to display the original positioning scale at one end edge of the transparent original receiving surface at an inner side thereof when the original is placed on the original receiving surface, and to withdraw the scale out of view of the operator when a photosensitive sheet is exposed to an optical image of the original, whereby full use can be made of the transparent original receiving surface at the time of exposure.

According to this invention, a device is provided for automatically displaying and withdrawing an original positioning scale for copying apparatus whereby the scale can be moved automatically to be displaying at one end edge of the original receiving surface on an underside thereof when the original is placed on the original receiving surface, but is withdrawn for the duration of actual exposure, so that the original receiving surface can be made full use of at the time of exposure without interfering with the exposing operation.

BRIEF EXPLANATION OF THE DRAWINGS

FIG. 1 is a perspective view of an electrophotographic copying apparatus of the automatic elevational original keep-plate type incorporating the device of this invention therein.

FIG. 4 is a schematic sectional side view of the device for automatically displaying and retracting an original positioning scale comprising another embodiment of this invention.

DESCRIPTION OF PREFERRED EMBODIMENT

Figure 2:
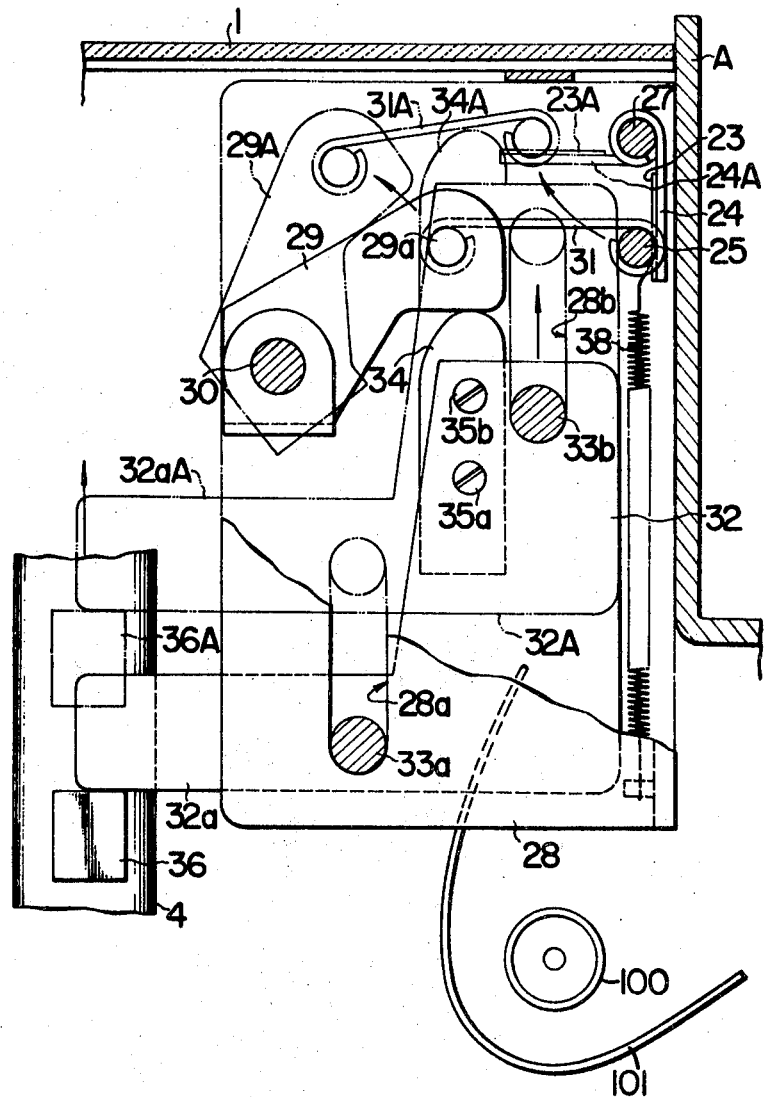
FIG. 2 is a schematic sectional side view of the device for automatically displaying and withdrawing an original positioning scale comprising one embodiment of this invention.

This invention will now be described with reference to embodiments shown in the accompanying drawings as being incorporated in an electrophotographic copying apparatus of the elevational original keep-plate type.

In FIG. 1, a transparent original receiving surface 1 is disposed at the top wall of an electrophotographic copying apparatus, and an original keep-plate 2 which is adpated to be brought into and out of engagement with original receiving surface 1 is supported by vertical support rods 3 and 4 elevationally secured to a rear portion of the copying apparatus. Original keep-plate 2, which is a rectangular plate made of rubber or the like and is relatively heavy includes frame members 5 and 6 disposed at its front and rear ends respectively and connected together by a relatively rigid connecting rod 7. Original keep plate 2 is hingedly connected at 8 and 9 to support rods 3 and 4 respectively.

Swing doors 10 and 11 are provided at the front of a lower portion of the front wall of the copying apparatus for housing such portion of the apparatus as a roll of photosensitive sheet (not shown) which is supplied to various sections of the copying apparatus.

An exposing device (not shown) is disposed in the copying apparatus immediately below copy receiving surface 1. A cutter and an electrically charging device (not shown) are arranged in suitable positions between the exposing device and the roll of photosensitive sheet. A developing and fixing device (not shown) is disposed on the right side of the exposing device in the figure. The photosensitive sheet that has passed through the developing and fixing device is discharged to a try 13 as a duplicate through an opening 12 formed in the right side wall of the copying apparatus. These devices of the copying apparatus referred to above are of known construction and operate in association with one another in a copying cycle upon receipt of instructions to initiate copying.

An operation panel is affixed to an upper right-hand portion of the front wall of the copying apparatus. A contrast control knob 15, print switch button 16, repeat counter (means for controlling the number of copying cycles) setting knob 17, reset and count-down change-over operation lever 18, manual and automatic operations change-over operation lever 19, power switch button 20 and indication lamps 21, 22 are disposed on operation panel 14 in the indicated order from right to left.

Levers 18 and 19 may be replaced by pushbuttons, and switch buttons 16 and 20 may be replaced by levers. The repeat counter is of the type which can be switched between reset operation and count-down operation. When change-over operation lever 18 is moved to an upper position in the figure, the repeat counter can be set at a reset operation; when moved to a lower position in the figure, it can be set to a count-down operation.

Original keep-plate 2 can be switched to an automatic operation when change-over operation lever 19 is moved to an upper position in the figure; it can be switched to a manual operation when lever 19 is moved to a lower position in the figure. When original keep-plate 2 is switched to an automatic operation, the change-over operation lever 19 for the repeat counter 19 is automatically set to a reset operation.

Original keep-plate 2 can be moved vertically in elevational motion when support rods 3 and 4 therefor are operated by suitable drive means. Upon depression of power switch button 20, original keep-plate 2 is disposed at its lower position immediately over original receiving surface 1 and begins to move upwardly to its upper position shown in FIG. 1 so as to permit the placing of an original on original receiving surface 1. If print switch button 16 is depressed after the original is placed on original receiving surface, then original keep-plate 2 moves downwardly again to its lower position where it holds down the original to permit initiation of a copying operation.

An original positioning scale 23 is arranged along one end edge 1a of original receiving surface 1 at the underside thereof as shown in FIG. 1. Scale 23 aids in correctly positioning the original on the original receiving surface 1 relative to the photosensitive sheet on which the image of the original is projected.

Figure 3:
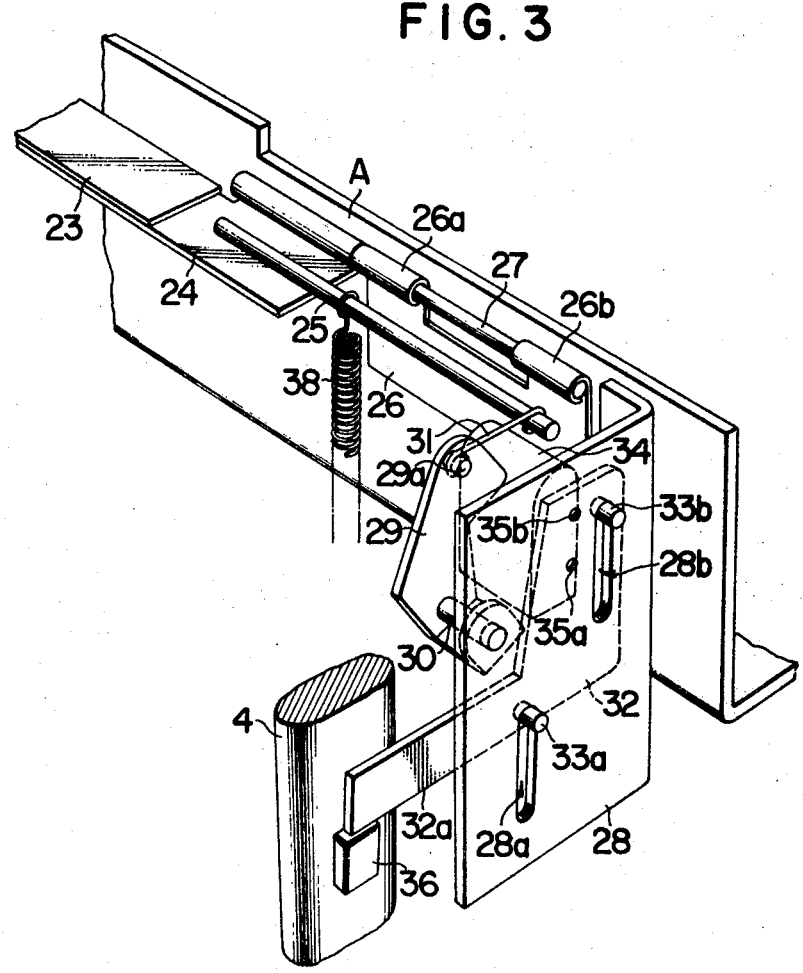
FIG. 3 is a perspective view of the device shown in FIG. 3 illustrating its construction.

In FIGS. 2 and 3, scale 23 is shown as being affixed to a receive plate 24 to which a support shaft 25 is firmly fixed. A rotary shaft 27 also firmly fixed to receive plate 24 is journalled by bearings 26a and 26b formed at one end portion of a plate 26 attached to a vertical wall A of the copying apparatus. Scale 23 can be moved angularly between a downwardly pointing vertical position shown in solid lines in FIG. 2 and a horizontal position shown in FIG. 3 by means of rotary shaft 27.

Attached fixedly to wall A is a vertical base plate 28 which supports a lever 29 through a support shaft 30 allowing pivotal motion of the lever 29 in a vertical plane perpendicular to the support shaft 30. One end of a guide rod 31 is secured to a pin 29a extending from the top end of lever 29, and the other end of guide rod 31 is pivotally secured to support shaft 25 to allow support shaft 25 to rotate with respect to guide rod 31. A coupling plate 32 has two pins 33a and 33b firmly secured thereto and loosely received in vertical slots 28a and 28b respectively which are formed in base plate 28 for guiding the vertical movement of coupling plate 32.

A push-up plate 34 is firmly secured by screws 35a and 35b to coupling plate 32 which includes a horizontal arm 32a engaging from above a catch 36 affixed to a lower portion of support rod 4. Horizontal arm 32a is moved upwardly by catch 36 when support rod 4 moves upwardly. A spring 38 is connected at one end thereof to support shaft 25 for normally urging support rod 25 to move in a direction where scale 23 is maintained parallel to the wall A of the copying apparatus, i.e., to the position shown in solid lines in FIG. 2.

Operation of the mechanism constructed as aforesaid for displaying and withdrawing the scale 23 will now be explained. Support rod 4 is in its lower position when original keep-plate 2 is in its closed position, or at the time of exposure. Accordingly, coupling plate 32 and push-up plate 34 secured thereto are also in their lower positions, and guide lever 29, guide rod 31, support shaft 25 and receive plate 24 are maintained in the positions shown in solid lines in FIG. 2 by the biasing force of spring 38. With this arrangement, scale 23 is withdrawn and maintained parallel to the wall A of the body of copying apparatus, i.e., the scale 23 is vertical, as shown in solid lines in FIG. 2. This exposes all the area of the original on original receiving surface 1 to the light of a light source 100, with a reflector 101, attached to a movable optical scanning system for exposing (not shown) and positioned below original receiving surface 1. Original positioning scale 23 is not interposed between the light source and original receiving surface 1.

Upon receipt of a signal produced when the copying operation is terminated, support rods 3 and 4 move upwardly to move original keep-plate 2 to its upper position. Upward movement of support rod 4 moves the horizontal arm 32a and coupling plate 32 upwardly through catch 36 to the positions 32aA and 32A respectively, shown in broken line in FIG. 2, thereby moving push-up plate 34 upwardly too.

The push-up plate 34 which is originally maintained in contact with a lower end of lever 29 as shown in solid lines in FIG. 2 pushes and causes guide lever 29 to pivot about support shaft 30 in a counterclockwise direction to the position 29A shown in broken lines in FIG. 2. Then, push-up plate 34 is brought into engagement with duide rod 31 and pushes it upwardly to the position 31A shown in broken lines in FIG. 2.

At this time, receive plate 24 and scale 23 affixed thereto are moved by means of support shaft 25 in the clockwise direction to the positions 24A and 32A respectively, shown in broken lines in FIG. 2, in which they are away from wall A and disposed horizontally, parallel to original receive surface 1.

When scale 23 is in this horizontal position, it can be readily read from outside. It is thus possible to correctly position the original on original receive surface 1 relatife to the copy sheet. When print switch button 16 is depressed after the original is placed on original receive surface 1, scale 23 is withdrawn into a vertical position (as shown in solid lines in FIG. 2) in which it does not interfere with the exposing operation.

FIG. 4 illustrates another embodiment of the device for automatically displaying and withdrawing an original positioning scale 23 wherein scale 23 is coupled to a movable member of a movable exposing optical system. When the exposing optical system is in its initial position (shown in broken lines at the right end in the figure), a coupling plate 40 pivotally supported through a shaft 39a by a support plate 39 affixed to the wall A of the copying apparatus is moved by a pin B attached to the optical system to the position shown in solid lines in FIG. 4. This moves scale 23 and receive plate 24 therefor from the vertical position shown in broken lines to a horizontal position shown in solid lines. In the horizontal position, scale 23 and plate 24 are parallel to original receive surface 1. When the exposing optical system moves leftwardly from its initial position to expose a copy sheet to an optical image of the original on original receive surface 1, the force exerted on pin B to cause the same to push coupling plate 40 is removed, so that scale 23 and receive plate 24 are allowed to pivot about rotary shaft 27 in the direction of the shown arrow by their own weight or by the biasing force of a spring 41 to their vertical position parallel to the wall A of the copying apparatus. Thus, when coupling plate 40 pivots clockwise about shaft 39a, scale 23, receive plate 24 and coupling plate 40 move to the broken line positions 23A, 24A and 40A respectively where scale 23 does not interfere with the exposing operation in which the original on original receive surface 1 is illuminated by light from a light source below the surface 1.

Coupling plate 40 is provided, at a portion thereof which comes into engagement with receive plate 24, with a holder 40a made of a material which reduces friction with receive plate 24.

What is claimed is:

1. Copying apparatus including a transparent original receiving surface (1), a light source (100), and means for exposing a copy sheet to light reflected from an original placed over the transparent original receiving surface (1) and illuminated by the light source placed at the side of said surface (1) opposite the side over which the original is placed, said apparatus also including first means (3 and 4, or B) moving between a first position held while said copy sheet is being exposed to light reflected from the original and a second position held at other times, wherein the improvement comprises an original positioning scale (23), a device for displaying the original positioning scale (23) to assist in proper positioning of the original over the surface (1) and for withdrawing the scale (23) for the duration of the exposure to avoid interference of the scale (23) with the light reflected from the original, said device including means (24, 26, 26a, 26b, 27, A) for supporting the scale (23) at the side of the original receiving surface (1) opposite the side over which the original is placed, means (36, 32a, 32, 34, 30, 29, 29 a, 31, 25 or 39a, 40, 40a) connecting the first means (3 and 4 or B) and the support means for holding the support means (24, 26, 26a, 26b, 27, A), at the time the first means is in its second position, at a first position at which the scale (23) is adjacent to the transparent original receive surface (1) and visible therethrough from the side of the original.

2. Apparatus as in claim 1 including return means (38 or 41) for moving the support means (24, 26, 26a, 26b, 27) to a second position, at the time said first means (3 and 4 or B) moves from its first to its second position, at which the scale (23) is away from the original receive surface (1) and does not interfere with the light reflected from an original placed thereon.

3. A device for automatically displaying and withdrawing an original positioning scale for copying apparatus of the type having a transparent original positioning scale with an inner side and an outer side and in which reflected light is used for exposing copy sheets to an image of an original placed on the outer side and which includes an actuating member actuated in association with an exposing operation, means for mounting said original positioning scale at one end edge of the transparent original receiving surface on the inner side thereof, a support rod rotatably disposed along said one end edge of said original receiving surface for supporting said scale to operate as a unit, an arm affixed to said support rod, and drive means for operating said arm in conjunction with the operation of an actuating member actuated in association with an exposing operation to display said scale on said original receiving surface when an original is to be placed on the original receiving surface and to withdraw the scale to a position in which it is moved away from the original receiving surface at the time of exposure.

4. a device as defined in claim 3 wherein said actuating member is a support shaft for vertically moving an original keep-plate in elevational motion.

5. A device as defined in claim 3 wherein said actuating member is a part of a movable exposing optical system.

* * * * *